United States Patent

[11] 3,619,127

| [72] | Inventors | Robert H. Hass<br>Fullerton;<br>Rowland C. Hansford, Yorba Linda, both of Calif. |
|---|---|---|
| [21] | Appl. No. | 581,175 |
| [22] | Filed | Sept. 22, 1966 |
| [45] | Patented | Nov. 9, 1971 |
| [73] | Assignee | Union Oil Company of California<br>Los Angeles, Calif. |

[54] METHOD OF PURIFYING AUTOMOTIVE EXHAUST GASES
4 Claims, No Drawings

[52] U.S. Cl. .................................................. 23/2 E, 252/470
[51] Int. Cl. .................................................. B01d 53/34, B01j 11/08
[50] Field of Search .................................... 252/458, 460, 465, 466, 470; 23/2.2, 288.3 F

[56] References Cited
UNITED STATES PATENTS

| 2,071,119 | 2/1937 | Harger | 23/2 |
|---|---|---|---|
| 3,224,831 | 12/1965 | Stephens | 23/2 |
| 2,861,959 | 11/1958 | Thorn et al. | 252/465 |
| 3,378,334 | 4/1968 | Bloch | 23/2 |
| 3,397,154 | 8/1968 | Talsma | 252/463 |
| 2,668,142 | 2/1954 | Strecker et al. | 252/466 X |
| 2,796,410 | 6/1957 | Strecker et al. | 252/466 X |
| 2,870,084 | 1/1959 | Strecker et al. | 252/466 X |
| 2,890,178 | 6/1959 | Thorn et al. | 252/466 X |

*Primary Examiner* — Earl C. Thomas
*Attorneys* — Milton W. Lee, Richard C. Hartman, Lannas S. Henderson, Robert E. Strauss and William S. Brown

ABSTRACT: Dilute combustible gases such as automobile exhaust gases, are oxidized by contacting the same at elevated temperatures with a catalyst comprising a minor proportion of a group VIII noble metal and a minor proportion of a group VIB metal, supported on a carrier such as alumina.

METHOD OF PURIFYING AUTOMOTIVE EXHAUST GASES

This invention relates to catalytic combustion of dilute combustible gases such as those occurring in automobile exhaust, particularly hydrocarbons.

Catalytic combustion of dilute combustible gases, such as occur in automobile exhaust, can be accomplished with a number of catalysts. However, many catalysts are not efficient at low temperatures, requiring a considerable warmup period before they become effective. It is desirable to initiate the combustion of hydrocarbons at low temperatures in order to remove atmospheric pollutants as soon as possible after engine startup. Catalysts which are active for the oxidation of carbon monoxide at low temperatures are particularly useful, since the heat of combustion of this reaction will rapidly raise the catalyst temperature to a level where hydrocarbon oxidation will also proceed rapidly. Platinum metal catalysts are very active at low temperatures for the combustion of dilute carbon monoxide-air mixtures. However, such catalysts are not useful for combustion of dilute hydrocarbons since they require very high temperatures unless employed in high-platinum metal concentrations, of the order of 0.5 percent, which are prohibitively expensive.

Supported group VI metals oxides, such as chromia, are very effective catalysts for promoting the combustion of dilute hydrocarbons at temperatures above about 600° F., but they are not effective for the combustion of carbon monoxide except at much higher temperatures. The warmup time required for effective operation on automobile exhaust is therefore undesirably long, and this cannot be shortened by means of the combustion of carbon monoxide without a suitable promoter.

It is therefore an object of the present invention to provide a catalyst that is capable of efficient oxidation of hydrocarbons at low temperatures, as well as at temperatures above about 600° F., thereby providing a short warmup period and removal of atmospheric pollutants soon after engine startup.

It has now been found that this object may be accomplished by the addition of a small amount of a platinum metal catalyst to a group VI metal oxide catalyst for the purpose of "triggering" the combustion of carbon monoxide at low temperatures which in turn will rapidly warm up the Group VI metal oxide to a temperature at which it will be effective for the combustion of hydrocarbons.

It has been further found that the specific manner in which the platinum metal catalyst is composited with the group VI metal catalyst is important in obtaining a catalyst with an optimum combination of high efficiency in combustion of hydrocarbons at high temperature, i.e., above about 600° F., and a short warmup period. The preferred manner of compositing the catalyst consists of preparation of a mechanical mixture of discrete particles, part of which contains the platinum metal supported on a suitable support and part of which contains the group VI metals oxide supported on the same or a different support. It is preferred to copellet a mixture of the fine catalyst particles into larger particles or pellets in order to avoid segregation of pellets in a reactor.

The preferred platinum metal is platinum since it combines optimum efficiency and cost. However, any of the other platinum metals, i.e., palladium, ruthenium, rhodium, osmium and iridium, as well as mixtures or alloys or these metals, may be used. Rhodium is as efficient as platinum at even lower concentration, i.e., below 0.1 percent. Concentrations of the platinum metal (in percent by weight) in the total catalyst composition may vary from about 0.01 percent to about 0.3 percent, with about 0.1 percent generally giving an optimum combination of efficiency and economy. Concentrations of the platinum metal on its support will vary from about 0.05 percent to 1.5 percent with about 0.2 percent to 0.5 percent generally being optimum.

The preferred group VI metal oxide is chromia; however, oxides of molybdenum, tungsten and uranium may also be used. Examples of such oxides are $MoO_3$, $WO_3$ and $U_3O_8$. Concentrations of the group VI metal oxide in the total catalyst composition may vary from about 1.0 percent to 20.0 percent, with about 4.0 percent to 10.0 percent generally being optimum. Concentrations of the group VI metal oxide on its support will vary from about 2.0 percent to 40.0 percent with about 5.0 percent to 20.0 percent generally being optimum.

The ratio of amounts of platinum metal-on-carrier to group VI metal-on-carrier will range from about 0.25 to about 10, with 1 to 4 generally being optimum. Obviously, optimum values of all of the above proportions of ingredients may vary considerably depending on the specific composition of the catalyst and the composition of the treated gases, and optimum values will be best determined empirically.

Supports for use in the invention are conventional catalyst supports or carriers, with alumina or silica-alumina (silica-stabilized alumina) being preferred. Other suitable supports include silica, zirconia, Titatnia, magnesia, silica-magnesia, silica-zirconia, kieselguhr, pumice, activated carbon, bauxite, etc. Particle size of the carrier will generally range from about one thirty-second to one-fourth inch (20 to 3 mesh). Again, optimum values are best determined empirically. The support for the platinum metal may be the same as or different from that for the group VI metal oxide.

The platinum metal and group VI metal oxide are deposited on their respective carriers by conventional means. For example, the platinum metal may be deposited by admixing the carrier particles with an aqueous solution of an acid or salt of the metal, e.g., chloroplatinic acid, or the corresponding ammonium salt. The impregnated particles are then dried and calcined to reduce the platinum compound to the metal and to activate the catalyst. The group VI metal oxides may also be deposited by impregnation from aqueous solutions, e.g., chromia catalysts may be prepared by impregnation of the carrier with ammonium bichromate solution, followed by drying and calcining to convert the chromium to the oxide. The platinum metal-containing catalyst particles may also be mixed prior to calcining, as shown in example VI, below. As also shown in the example, this procedure may also employ pelleting of the mixture of catalyst particles to form a copelleted product that is not subject to segregation of the pellets in a reactor.

The following examples will serve to illustrate the invention and the advantages thereof. All concentrations are expressed in percent by weight. Experimental results of the examples are shown in table I.

EXAMPLE I

A commercial catalyst comprising 0.5 percent platinum supported on gamma-alumina was tested for the conversion of the dilute combustibles in the exhaust gas from a single-cylinder gasoline engine. The exhaust gas was preheated to two different temperatures (600° and 800° F.) and passed over a bed of the catalyst at an hourly space velocity of 7,000. The gas was sampled before and after the catalyst bed and analyzed by infrared absorption. The effectiveness of the catalyst is expressed as percent conversion of $C_3^+$ hydrocarbons, methane, ethylene, acetylene and carbon monoxide.

EXAMPLE II

A catalyst consisting of 5 percent $Cr_2O_3$ supported on silica-stabilized alumina (8 percent $SiO_2$) was prepared by impregnating the support with an aqueous ammonium bichromate solution, followed by drying at 150° C. and calcining at 600° C. for 10 hours. This catalyst was tested as in example I.

EXAMPLE III

A catalyst 0.2 prepared to contain 5.2 percent $Cr_2O_3$ by impregnation of silica-stabilized alumina with ammonium bichromate, followed by drying and calcining as in example II. The calcined pellets were then impregnated with chloroplatinic acid solution to incorporate 0.2 percent platinum in the finished catalyst, followed by drying and calcining at 600° C. for 10 hours. This catalyst was tested as above.

EXAMPLE IV

A catalyst was prepared by first impregnating a silica-stabilized alumina support with 0.1 percent platinum from chloroplatinic acid solutions. The pellets were dried and calcined for 2 hours at 500° C. The calcined pellets were then impregnated with ammonium bichromate solution to incorporate 5.2 percent $Cr_2O_3$ in the finished catalyst after drying and calcining at 600° C. for 2 hours. The catalyst was tested as above.

EXAMPLE V

A composite blend of 20 percent by volume of the catalyst of example I and 80 percent of the catalyst of example II was prepared and tested as above.

EXAMPLE VI

A catalyst was prepared by soaking 270 grams of silica-stabilized alumina hydrate powder (spray-dried product containing about 6 percent $SiO_2$ and 25 percent $H_2O$) in 300 ml. of a solution containing 1.0 gram of $H_2PtCl_6 \cdot H_2O$. The platinum salt was completely adsorbed from solution, giving a product which on calcination would contain 0.2 percent platinum supported on 92 percent $Al_2O_3 \cdot 8$ 8 percent $SiO_2$. The impregnated powder was filtered out and dried at 150° C.

A second portion of the same silica-alumina hydrate was soaked in 310 ml. of a solution containing 135 grams of $(NH_4)_2Crb-2O_7$. The amount of solution taken up by the powder was 150 ml., giving a product which after calcination would contain 18.8 percent $Cr_2O_3$. The impregnated powder was filtered and dried at 150° C.

The two dried powders were then mixed thoroughly and pelleted into ⅛-inch pellets. The pellets were calcined at 600° C. for 10 hours. The copelleted product thus contained 0.1 percent platinum and 9.4 percent $Cr_2O_3$. This catalyst was tested as above.

From the above results it is evident that:

1. A mixture of discrete particles of supported platinum and of supported chromia is superior to either one alone, as far as effecting complete combustion of hydrocarbons is concerned.

2. A mixture of discrete particles of supported platinum and of supported chromia is nearly as effective in promoting the complete combustion of carbon monoxide as is a supported platinum catalyst containing five times as much platinum.

From these results it is clear that small amounts of platinum will enable a cheaper chromia catalyst to function effectively in removing pollutants from automobile exhaust, particularly when the platinum is supported on separate discrete particles. The two separately supported components will function equally well whether they remain as separate discrete particles or whether the discrete particles are consolidated into larger particles as by pelleting, extrusion, and the like.

We claim:

1. A method for purifying automotive exhaust gases which comprises passing said gases at an elevated temperature in contact with a catalyst comprising discrete separate particles of (1) between about 0.05 and 1.5 weight-percent of a group VIII noble metal supported on a relatively inert carrier, and (2) between about 2 and 40 weight-percent of a group VIB metal oxide supported on a relatively inert carrier.

2. A method as defined in claim 1 wherein said group VIII noble metal is platinum and said group VIB metal oxide is chromia.

3. A method s defined in claim 2 wherein said inert carriers consist essentially of alumina or silica-stabilized alumina.

4. A method as defined in claim 1 wherein said discrete separate particles are copelleted.

TABLE 1.—CONVERSION OF COMBUSTIBLES IN AUTOMOBILE EXHAUST

| Catalyst | Preheat temperature, °F. | $C_3+$ Hydrocarbons | Methane | Ethylene | Acetylene | Carbon monoxide |
|---|---|---|---|---|---|---|
| Example I | 600 | 93.7 | 76.0 | 100 | 90.7 | 100 |
|  | 800 | 96.5 | 82.2 | 100 | 91.2 | 100 |
| Example II | 600 | 80.5 | 78 | 76.7 | 91.0 | 24.1 |
|  | 800 | 98.5 | 91.3 | 100 | 91+ | 62.8 |
| Example III | 600 | 70.9 | 70.9 | 53.7 | 91.5 | 33.7 |
|  | 800 | 96.9 | 73.5 | 93.4 | 91.5 | 63.6 |
| Example IV | 600 | 51.7 | 72.2 | 60.5 | 90.4 | 27.6 |
|  | 800 | 100 | 83.6 | 95.5 | 91.3 | 59.7 |
| Example V | 600 | 94.0 | 76.0 | 100 | 91.2 | 97.3 |
|  | 800 | 97.7 | 81.0 | 100 | 91.5 | 98.3 |
| Example VI | 600 | 95.6 | 84.9 | 100 | 91.1 | 88.3 |
|  | 800 | 100 | 92.4 | 100 | 91.0 | 96.0 |